United States Patent Office 2,870,832
Patented Jan. 27, 1959

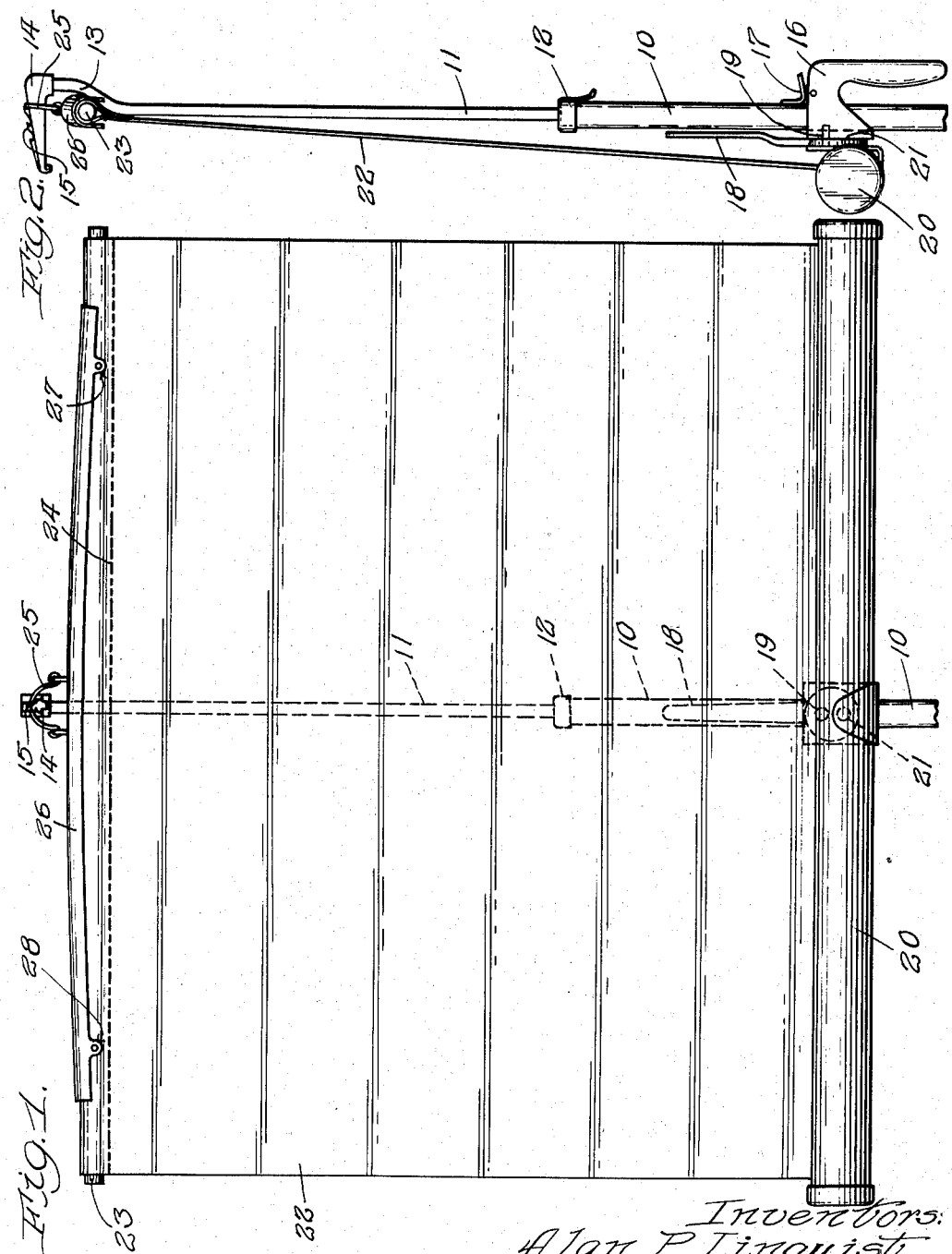

2,870,832
PICTURE SCREEN

Alan P. Linquist and Russell E. Petrick, Park Ridge, Ill., assignors to Knox Manufacturing Co., a corporation of Illinois Application May 21, 1954, Serial No. 431,393

1 Claim. (Cl. 160—351)

This invention relates to portable picture screens, and more particularly to a picture screen structure capable of withstanding large screen tensioning forces with a minimum of bending.

With the advent of stero and color picture projection in the home, screen tensioning devices have rapidly come into prominence. Two such devices are shown in the application of Edward J. Petrick, Serial No. 363,121, filed June 22, 1953, now Patent No. 2,793,687, issued May 28, 1957, which is illustrated briefly in the present drawing and in the application of Edward J. Petrick et al., Serial No. 375,369, filed August 20, 1953, now Patent No. 2,822,040, issued February 4, 1958. To portray color or stereo pictures in their best perspective, a very taut screen is highly desirable.

However, the tensioning forces exerted to eliminate wrinkles from the screen are frequently so great that the standard is caused to flex longitudinally. Such flexing disturbs the angular disposition of the screen so that the screen is no longer normal to the path of light from the projection machine, and the picture may be blurred or slightly out-of-focus. In addition, prolonged flexing of the screen standard may permanently stress the material involved.

Considerations of weight and economy of manufacture suggest that in portable screens the structural parts should not be enlarged to remedy the above deficiencies. The present invention provides a structure which obviates these deficiencies, and yet is light in weight and economical to manufacture.

The primary object of the present invention is to provide a screen stand structure in which longitudinal bending flexure of the screen standard is reduced by minimizing the moment of the screen-tensioning force being applied to the standard.

Another object is to provide a picture screen in which the angular disposition of a screen in exposed position may be varied by several degrees.

A further object is to provide a picture screen in which the angular disposition of the screen may be closely regulated by selectively attaching the free end of the screen to any one of a plurality of bail-receiving members and by applying varying tensioning forces to the screen to vary the moment of the force applied to the standard which in turn regulates longitudinal flexure of the standard.

The invention is illustrated in the preferred embodiment in the accompanying drawings in which:

Fig. 1 is a broken elevational view of a tensioned picture screen in exposed position; and Fig. 2 is a broken side elevational view of the picture screen shown in Fig. 1.

In the embodiment illustrated, an upright tubular standard 10 is generally supported upon a tripod base, not shown. A telescoping rod 11 is slidably received in the standard 10 and may be held in varying degrees of extended position by a locking member 12, usually a type of Swedish clamp. The upper portion 13 of the rod 11 is curved or offset rearwardly and terminates in a bail support 14 which, with the upper portion 13 forms a goosenecked screen support.

The bail support has several bail-receiving hooks 15, herein shown as three in number, and at least one of the hooks 15 is positioned substantially in longitudinal alinement with the telescoping rod 11. The purpose of this alinement is so that the moment of the screen-tensioning force will be lessened, and the tendency toward longitudinal flexure of the rod 11 will be minimized. Of course, as the point of support of the free end of the screen is moved forwardly of the longitudinal axis of the rod 11, the rod 11 will flex more because the moment arm of the force acting on the rod is greater.

The handle 16 is slidably mounted on the main standard 10. A thumb latch 17 mounted on the handle 16 is adapted to be received in any one of a plurality of holes (not shown) in the standard 10 to provide the handle 16 with varying positions of vertical adjustment on the standard 10.

A tensioning lever 18 is mounted on the handle 16 by a machine screw 19, and the screen casing 20 is in turn piovtally secured to the lever 18 by a second machine screw 21. It can be seen that the casing 20 is eccentrically mounted of the lever 18 so that by turning the lever 180° downwardly or upwardly the casing is raised or lowered depending upon which way the lever 18 is turned. A more detailed description of this particular tensioning mechanism is provided in the aforementioned application, Serial No. 363,121, but it is understood that other types of screen tensioning devices may be used for varying the tensioning forces on the screen without departing from the purview of this invention.

A flexible screen 22 is normally attached at its lower marginal edge to a conventional window shade type roller (not shown) journaled within the casing 20, and at its upper edge to a substantially inflexible rod 23 by stitching 24. A bail member 25 is preferably secured to the middle portion of a flexible bridge member 26 which is pivotally attached at its ends to the rod 23. When the screen 22 is under tensioning forces, these forces act through points 27 and 28 to flex the bridge 26 which, in tending to regain its normal shape, uniformly stretches the screen 22 across its width.

When it is desired to put the screen in operative position, the casing 20 is pivoted 90° from its storage position adjacent and parallel to the standard, and the screen 22 is extended and suspended from the bail support 14 by the bail member 25. The desired tension is placed on the screen by turning the lever 18, causing the screen casing 20 to be lowered accordingly to stretch the screen between its roller and the rod 23.

If large tensioning forces are needed, the bail 25 should first be placed in the hook 15 which is directly over the telescoping rod 11, as shown in Fig. 2. The telescoping rod 11 is then manually pulled outwardly of the standard 10 so that the bail support 15 carries the bail member 25 and the screen 22 upwardly until the screen is completely unrolled from the roller and is manually stretched between the roller and the rod 23. When the lever 18 is rotated, the screen-tensioning force is increased, and since the bail is positioned directly over the telescoping rod 11, the flexing torque on the rod 11 is minimized. The positioning of one of the hooks 15 in longitudinal alinement with the rod 11 is permitted by the curved portion 13 in the telescoping rod 11, and it is responsible for reducing axial flexure of the telescoping rod.

The foregoing detailed description is given for clearness of understanding only and no unnecessary limitations should be understood therefrom for some modifications will be obvious to those skilled in the art.

We claim:

A portable picture screen structure, comprising: an elongated upright standard for supporting a picture screen in exposed position, said standard being resiliently, axially flexible and having an upper end portion terminating in a plurality of fastening hooks positioned transversely of the axis of the standard, said upper end portion being curved rearwardly and forming a goose-necked screen support with said plurality of fastening hooks, one of said fastening hooks being positioned in longitudinal alignment with the standard; a flexible screen provided with a bottom rod attached to the standard and a top rod adapted for selective attachment with each one of said hooks to suspend said screen in exposed position in any one of a number of positions of inclination; and an adjustable screen tensioning device for applying varying stretching forces to the screen to pull said screen taut between said rods, the angular disposition of said screen in exposed position being variable with respect to the horizontal by preselection of the point of suspension of said screen from said hooks and by varying the applied force upon the screen from said adjustable screen tensioning device to vary the resilient flexure of said supporting standard.

References Cited in the file of this patent

UNITED STATES PATENTS

| | | |
|---|---|---|
| 1,468,369 | Moltrup | Sept. 18, 1923 |
| 1,823,141 | Hendrickson | Sept. 15, 1931 |
| 1,834,144 | Coderre et al. | Dec. 1, 1931 |
| 2,346,274 | Raven | Apr. 11, 1944 |
| 2,549,584 | Eller | Apr. 17, 1951 |
| 2,696,249 | Prokop et al. | Dec. 7, 1954 |

FOREIGN PATENTS

| | | |
|---|---|---|
| 609,602 | Great Britain | Oct. 4, 1948 |
| 649,385 | Great Britain | Jan. 24, 1951 |